No. 693,256. Patented Feb. 11, 1902.
Z. T. FURBISH.
CHUCK.
(Application filed Feb. 27, 1901.)
(No Model.)
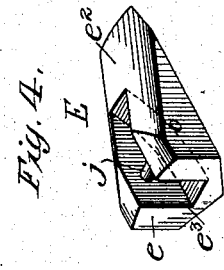
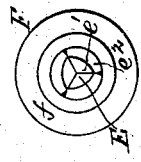
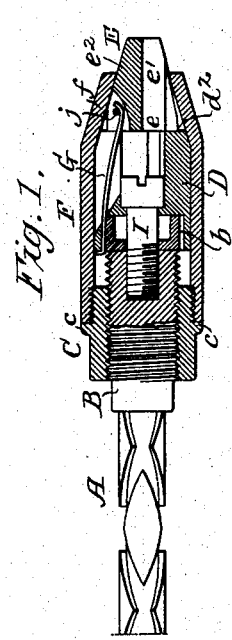
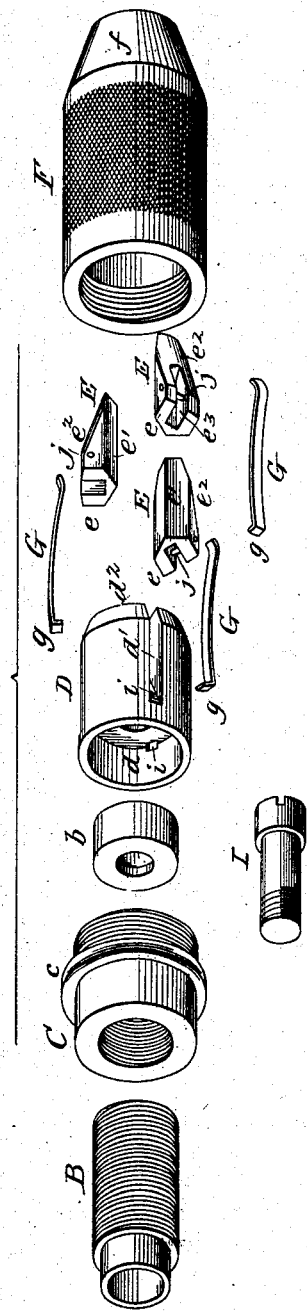
Witnesses:-
Herman E. Metius.
Wm. A. Barr.
Inventor
Zachry T. Furbish
by his Attorneys
Howson & Howson

UNITED STATES PATENT OFFICE.

ZACHRY T. FURBISH, OF PHILADELPHIA, PENNSYLVANIA, ASSIGNOR TO NORTH BROTHERS MANUFACTURING COMPANY, OF PHILADELPHIA, PENNSYLVANIA, A CORPORATION OF PENNSYLVANIA.

CHUCK.

SPECIFICATION forming part of Letters Patent No. 693,256, dated February 11, 1902.

Application filed February 27, 1901. Serial No. 49,135. (No model.)

*To all whom it may concern:*

Be it known that I, ZACHRY T. FURBISH, a citizen of the United States, residing in Philadelphia, Pennsylvania, have invented certain Improvements in Chucks, of which the following is a specification.

The object of my invention is to so construct a chuck for securing bits and drills to spindles that it can be cheaply manufactured and readily assembled and which will center the drill and hold it rigidly.

In the accompanying drawings, Figure 1 is a longitudinal sectional view of my improved chuck. Fig. 2 is an end view showing the jaws closed. Fig. 3 is a perspective view showing the parts of the chuck detached, and Fig. 4 is an enlarged view of one of the jaws.

I have shown my invention as applied to a drill-spindle A having spiral grooves, so that a device can be used to rotate the chuck by hand; but it will be understood that the chuck can be attached to a spindle to be applied to a lathe or a head of a drilling-machine without departing from my invention.

B is a screw-plug fastened to a spindle A. This plug has an external screw-thread on which is screwed the ring C, provided with an external flange c.

D is the jaw-carrier, having a recess d at its rear end, in which fits a cup-shaped block b.

I is a headed screw which extends through an opening in the jaw-carrier D and through the block b into a threaded opening in the end of the screw-plug B, thus securing the carrier to the plug. In the present instance the carrier D has three slots d' and has a flat end $d^2$, forming a rest for the jaws E—three in the present instance. These jaws have flat rear portions e, which rest against the end $d^2$ of the carrier D, so that this end forms a slideway for the jaws when they open and close. Each jaw E has a V-shaped bearing-surface e' for clutching the bit or drill, and each jaw has a tapered portion $e^2$, against which bears the tapered portion f of the sleeve F. This sleeve has an internal screw-thread at its opposite end engaging with a screw-thread on the ring C, as clearly shown in Fig. 1.

G represents springs for forcing the jaws out as the sleeve F is backed off. These springs are arranged in the grooves d' of the carrier D and pass through slots i in the end of the groove and have lips g, which lap over the rear end of the carrier. After these springs are in place the block b is inserted in the end of the carrier, so as to confine the springs to the carrier. The outer ends of each spring are slightly curved and pass back of pins j, which extend across slots $e^3$ in each jaw E, so that the tendency of the springs is to force the jaws apart against the pressure of the sleeve F and to draw the jaws back when released.

In assembling the parts of the chuck the hub B is secured to the spindle A in any suitable manner, the threaded ring is screwed onto the hub, and the springs are placed in position in the carrier D. The hub B is inserted in the opening d, holding the springs in position. The screw I is then passed through the opening in the carrier and through the opening in the block and into the screw-threaded opening in the plug, thus confining the carrier and block to the plug. After these parts are assembled the jaws are then placed in position on the end of the carrier with the ends of the springs G back of the pins j, after which the sleeve F is slipped over the jaws and over the carrier and screwed onto the threaded ring C. The sleeve is forced tightly against the flange c of the ring C, so that the ring and sleeve move as a unit. When it is wished to operate the chuck, the sleeve F is turned, turning the ring C with it on the screw-threaded hub B, causing the parts to move longitudinally on the hub and carrier. When the sleeve and ring are moved in one direction, the jaws are drawn together, and when moved in the opposite direction they are free, and the springs force them apart, so that a drill or bit within a certain limit can be inserted between the jaws, and by turning the sleeve the jaws can be drawn tightly onto the drill or bit, holding it firmly to the chuck.

I claim as my invention—

1. The combination of a hub having an external screw-thread, a carrier having a cavity at its rear end, a block mounted in the cavity, springs carried by the carrier and held in position by the block, a screw confining the carrier and block to the hub, jaws mounted on the end of the carrier and engaged by the springs, with a shell screwed onto the threaded hub and bearing against the jaws, substantially as described.

2. The combination in a chuck, of a hub having an external screw-thread, a carrier secured to the hub, said carrier having a recess at its rear end and having a series of cavities united to the recess by slots, springs mounted in the cavities and extending through the slots into the recess, a block in the recess tending to hold the springs in position, said springs having lips at their rear ends engaging the carrier, jaws at the end of the carrier with which the opposite ends of the springs engage, and a shell mounted on the screw-threaded portion of the hub and bearing against the jaws, substantially as described.

3. The combination in a chuck, of a hub having an external screw-thread, a carrier, a block, a screw confining the carrier and block to the hub, springs mounted in slots in the carrier, jaws bearing against the end of the carrier and recessed, pins extending across the recess of each jaw, the springs extending into the recess back of the pins, with a shell mounted on the screw-threaded portion of the hub and engaging the jaws, substantially as described.

4. The combination of a spindle having a screw-threaded end, a shell with a ring, a jaw-carrier, jaws attached thereto, springs acting to normally keep said jaws open, and means for operatively connecting the jaw-carrier and the spindle, substantially as described.

5. The combination of a spindle having a screw-threaded end, a shell with a ring, a cylindrical jaw-carrier, jaws attached thereto, springs acting to normally keep said jaws open, and a bolt for operatively connecting the jaw-carrier and the spindle, substantially as described.

6. The combination of a spindle having a screw-threaded end, a shell, a ring, a jaw-carrier having in it a cavity, jaws, springs entering the said cavity and acting on said jaws, a piece in the cavity engaging the springs and means for operatively connecting the jaw-carrier and the spindle passing through said piece, substantially as described.

7. The combination with a chuck of a movable cylindrical jaw-carrier having in it a cavity, slots in said carrier, jaws, springs in the slots extending into the cavity in the carrier, and a piece in said cavity engaging said springs, substantially as described.

8. The combination of a spindle having a screw-threaded end, a shell with a ring, a jaw-carrier, jaws and springs for the same, said spindle normally acting on the springs to keep the jaws in an open position, substantially as described.

In testimony whereof I have signed my name to this specification in the presence of two subscribing witnesses.

ZACHRY T. FURBISH.

Witnesses:
WILL. A. BARR,
JOS. H. KLEIN.